United States Patent
Mathew Abraham et al.

(10) Patent No.: US 12,253,947 B2
(45) Date of Patent: Mar. 18, 2025

(54) TECHNOLOGIES FOR CONFIGURATION OF MEMORY RANGES

(71) Applicant: Intel Corporation, Santa Clara, CA (US)

(72) Inventors: Vinit Mathew Abraham, Hillsboro, OR (US); Yen-Cheng Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 744 days.

(21) Appl. No.: 17/223,994

(22) Filed: Apr. 6, 2021

(65) Prior Publication Data

US 2021/0224190 A1     Jul. 22, 2021

(51) Int. Cl.
*G06F 12/00*     (2006.01)
*G06F 12/0815*     (2016.01)

(52) U.S. Cl.
CPC .. *G06F 12/0815* (2013.01); *G06F 2212/1032* (2013.01)

(58) Field of Classification Search
CPC ............. G06F 12/0815; G06F 12/0806; G06F 12/0877; G06F 2212/1032
See application file for complete search history.

(56) References Cited

U.S. PATENT DOCUMENTS

| | | | |
|---|---|---|---|
| 8,862,828 B2 | 10/2014 | Saraf et al. | |
| 2004/0215893 A1* | 10/2004 | Emerson | G06F 12/0888 711/131 |

OTHER PUBLICATIONS

"Mesh Interconnect Architecture-Intel", WikiChip Semiconductor & Computer Engineering, https://en.wikichip.org/wiki/intel/mesh_interconnect_architecture, Nov. 2021, 7 pages.

Mulnix, David L., "Intel® Xeon® Processor Scalable Family Technical Overview", Intel, https://www.intel.com/content/www/us/en/developer/articles/technical/xeon-processor-scalable-family-technical-overview.html, Jul. 2017, 24 pages.

* cited by examiner

*Primary Examiner* — Shawn X Gu

(74) *Attorney, Agent, or Firm* — Compass IP Law PC

(57) ABSTRACT

Examples described herein relate to programming a memory rule for a home agent, wherein the programming a memory rule for a home agent comprises: receiving at least one memory rule programming and based on a cluster associated with the home agent, configuring a memory rule register using a memory rule programming from among the at least one memory rule programming. In some examples, receiving at least one memory rule programming includes receiving a first memory rule programming and receiving a second memory rule programming. In some examples, a mask is applied to reject the first memory rule programming; and applying the mask to accept the second memory rule programming and program the memory rule for the home agent.

20 Claims, 8 Drawing Sheets

TECHNOLOGIES FOR CONFIGURATION OF MEMORY RANGES

In a system with multiple cache devices, a Caching/Home Agent (CHA) may attempt to maintain cache coherency among the multiple cache devices so that any modification of data associated with a memory address is readily available for storage in another cache for processing. A cache can be divided into slices, where different slices can be accessed in parallel. There are various modes for clustering CHA last level cache (LLC) slices on a die.

Sub-non-uniform memory access (NUMA) clustering (SNC) mode aims to improve latency of access to the LLC and to memory devices by partitioning a central processing unit (CPU) socket into clusters so that the LLC slices and cores are allocated to distinct NUMA clusters based on their proximity to a particular memory controller or in-package memory agent. This mode partitions LLC slices into disjoint system address ranges. SNC may create multiple localization domains within a processor by mapping addresses from one of the local memory controllers in a cluster of the LLC slices closer to that memory controller and addresses mapped to the another memory controller into the LLC slices in another cluster. Through this address-mapping scheme, processes running on cores in one of the SNC domains access memory using a memory controller in the same SNC domain and observe lower LLC and memory latency compared to latency on accesses mapped to LLC and memory devices outside of the SNC domain.

FIG. 1 shows two modes of dividing CHA slices on a die into clusters. Since placement of the clusters is based upon physical proximity to a memory device on the package, memory controllers as well as in-package memory are laid out around the edges of the die somewhat symmetrically so that the CHAs and cores on the die can be divided in half vertically or horizontally (for 2-way Sub-NUMA clustering) or both vertically and horizontally (for 4-way Sub-NUMA clustering. Strict symmetry is not explicitly required to utilize the feature.

For a given snoop or memory transaction to a cluster, a difference between the two modes is in how the cluster ID is chosen. A mode divides the die into NUMA domains and uses a set of range checks to determine the cluster ID. Another mode uses a pair of address bits to select the cluster ID and interleaves the address space across the clusters in a UMA fashion.

For SNC mode, the CHA slices in a SNC cluster domain are partitioned to access only memories in a cluster and memory decoders in a CHA are to be programmed to access such memories. In some scenarios, the number of memory decoders per CHA may be set to correspond to all memory devices for all clusters even if a cluster is to only access a subset of the memory devices. Some fabrics (e.g., Intel® Xeon® register fabric) perform a multi-cast to all CHA slices to program memory decoders. Intel® Xeon® register fabric supports a predefined multi-cast register access method across all CHAs used by a Basic Input/Output System (BIOS) for memory access rule programming. Accordingly, memory decoders for slices may be programmed even if not all memory decoders are used to access a memory device.

DETAILED DESCRIPTION

Various embodiments provide at least a memory cluster with memory decoder circuitry that are only associated with memory devices accessible to the memory cluster. When multi-cast programming of memory decoders of multiple clusters is utilized, various embodiments provide that firmware enable or disable programming per-cluster followed by multi-cast programming of memory access rules to the clusters. As part of mesh fabric initialization during boot, one or more CHAs are configured with a cluster identifier (ID). In some examples, a cluster can include a mask register that is set to accept or gate (deny) programming of its memory decoder(s) based on a setting of its mask register. For example, in a first multi-cast of memory access rule programming, to program a cluster 0 among clusters 1-3, the cluster 0 can be unmasked and clusters 1-3 are masked to permit programming of cluster 0 and deny programming of clusters 1-3. In a second multi-cast of memory access rule programming, to program cluster 1, the cluster 1 can be unmasked and clusters 0, 2, and 3 are masked to permit programming of cluster 1 and deny programming of clusters 0, 2, and 3. The multi-casting of memory access rule programming can be repeated to provide memory access rule programming to clusters 2 and 3.

In a scenario where memory rules are multi-cast to multiple clusters, such as using an Intel® Xeon® register fabric or other fabrics or connections, various embodiments permit programming of solely of memory rule circuitry for memory devices accessible to a particular cluster. However, a cluster can include memory rule circuitry for memory devices that are not accessible to a particular cluster to permit the cluster to scale up and access additional memory devices. Accordingly, various embodiments can reduce an amount of memory rule circuitry used in a cluster to merely access memory devices associated with the cluster. For example, for SNC4 mode, a number of dynamic random access memory (DRAM) rule decoders for CHAs can be reduced by a factor of 4 for a clustered memory region. Reducing a number of memory rules can reduce the overall area occupied by CHAs and reduce latency to determine whether a CHA (or home agent) can access a region of memory in a memory device.

Figure 1:
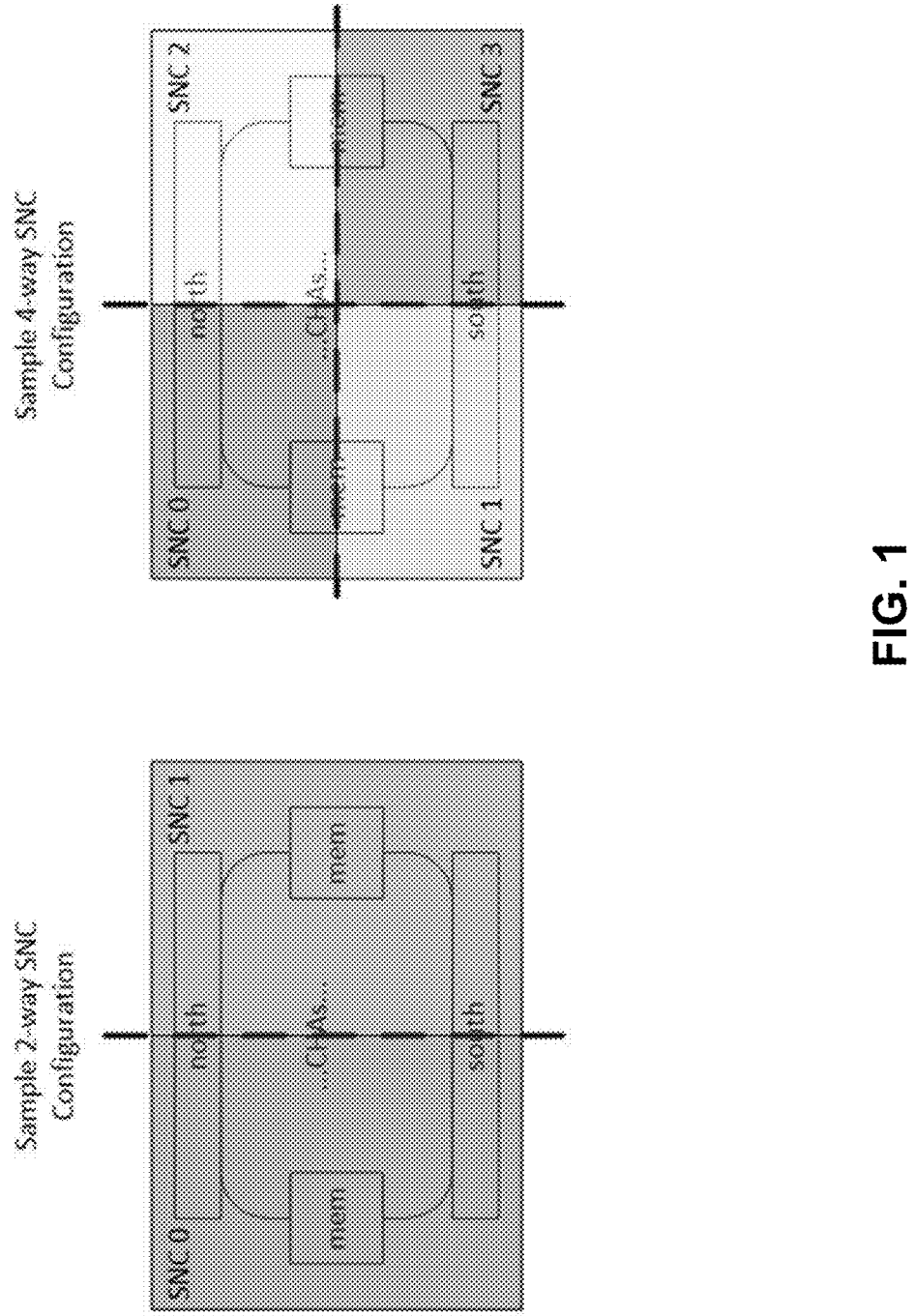
FIG. 1 depicts examples of SNC configurations.
Figure 2:
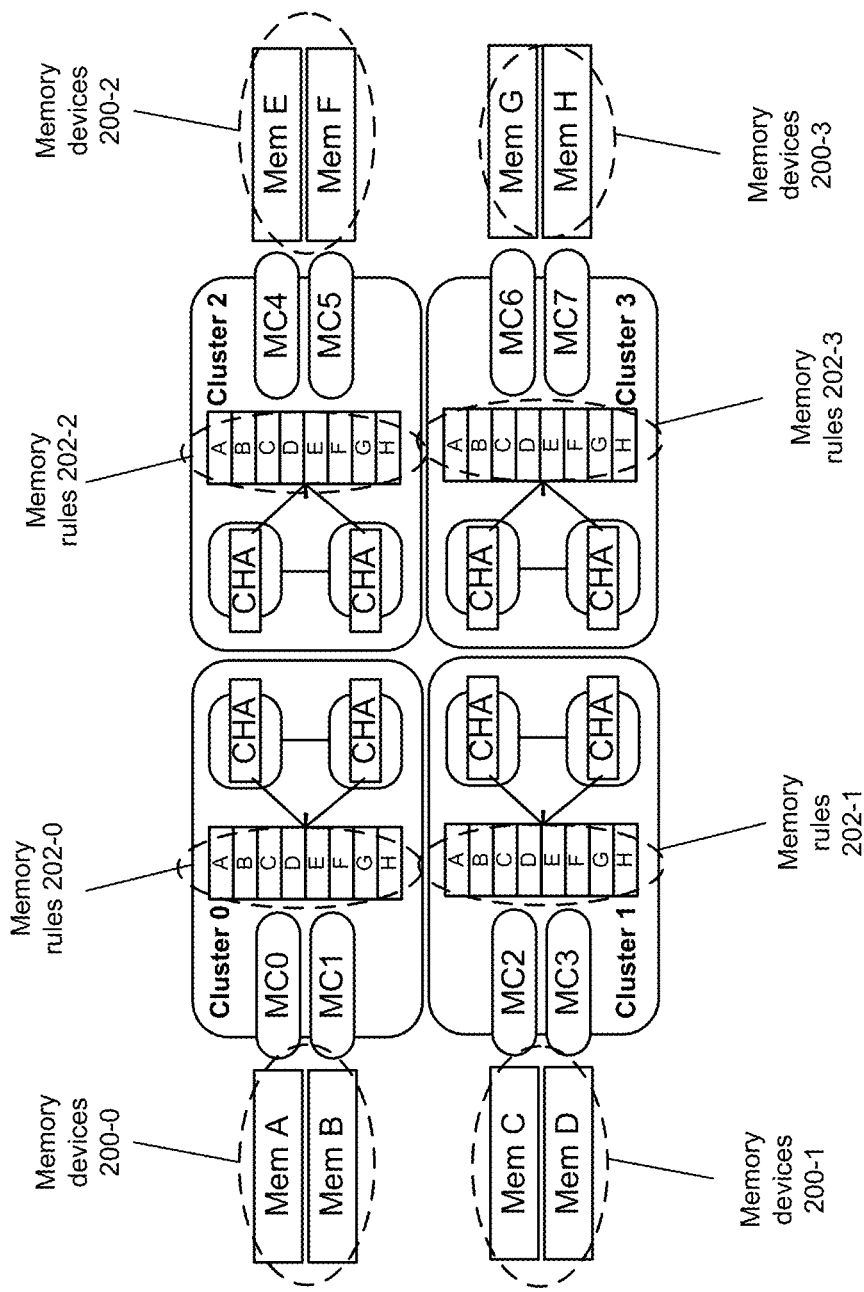
FIG. 2 depicts an example configuration.

FIG. 2 depicts an example topology of clusters. In this example, CHA clusters 0 to 3 are designated and a cluster uses two memory controllers (MCs). In some examples, cluster 0 can be associated with one or more cores and memory devices A and B but includes memory rules 202-0 for memory devices A-H, thereby providing 8 memory rules. However, cluster 0 would merely utilize memory rules A and B (2 memory rules) to provide access to respective memory devices A and B (memory devices 200-0). Similarly, cluster 1 can be associated with one or more cores and include memory rules for memory devices C and D because memories C and D are associated with cluster 1 and cluster 1 also includes decoders for memories A, B, and E-H. Clusters 2 and 3 can be associated with one or more cores and include respective MCs 4-5 and MCs 6-7 for respective memories E-F and G-H, and both can also include decoders for memories A-H. Programming memory rules of clusters 0-3 for memory devices (A-H) programs memory rules of clusters 0-3 in the same manner.

Figure 3:
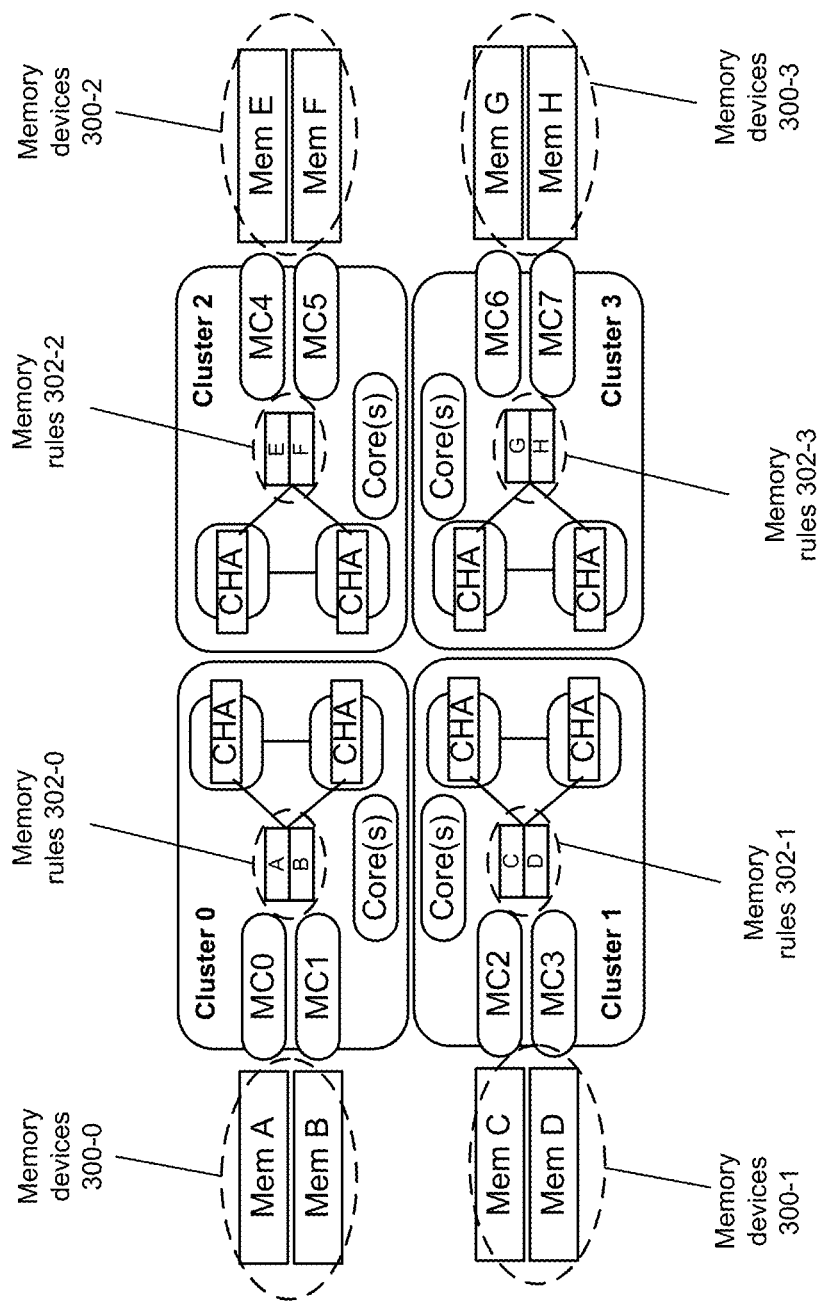
FIG. 3 depicts an example configuration.

FIG. 3 depicts an example system that programs merely memory rules for memory devices associated with CHAs of a particular cluster, although other numbers of clusters, memory rules, and MCs can be used for a cluster. In this example, for cluster 0, CHAs perform cache coherency for memory addresses associated with memory devices A and B. Cluster 0 can be associated with one or more cores and include memory rules for memory devices A and B. Cluster 1 can be associated with one or more cores and include memory rules for memory devices C and D. Cluster 2 can be associated with one or more cores and include memory rules for memory in 5 devices E and F. Cluster 3 can be associated with one or more cores and include memory rules for memory devices G and H.

In this example, for cluster 0, CHAs may perform cache coherency for memory addresses associated with memory devices A and B and include memory rules for memory devices A and B. In this example, for cluster 1, CHAs may perform cache coherency for memory addresses associated with memory devices C and D and include memory rules for memory devices C and D. In this example, for cluster 2, CHAs may perform cache coherency for memory addresses associated with memory devices E and F and include memory rules for memory devices E and F. In this example, for cluster 3, CHAs may perform cache coherency for memory addresses associated with memory devices G and H and include memory rules for memory devices G and H. Accordingly, a cluster may include memory rule circuitry for merely the memory devices whose memory addresses a cluster's CHA performs cache coherency. An amount of circuitry used for memory rules can be reduced as memory rules may not be present in a cluster for memory devices not associated with the cluster. However, a cluster can be formed with more unused memory rules in case CHAs of the cluster are to manage cache coherency for more memory devices.

For example a cache coherency operation can include attempting to maintain uniformity of data stored in multiple caches and/or memory devices so that changes in the data are propagated across multiple caches and/or memory devices in a timely manner. For example, snooping can be performed to monitor for accesses to memory locations that are cached to identify changes to data associated with one or more of the memory locations. In some examples, a home agent of a CHA can access a memory rule to determine if a range of addresses are managed by the CHA so that the home agent can access the memory for a core that is attempting to access content within the range of addresses if no other cache stores the data. The CHA can resolve coherency and perform a read from a memory device and after coherency is resolved, the core can access data from memory.

In some examples, a memory rule could be programmed by programming its registers with base (e.g., lower address) and limit (e.g., end address) values as well as memory type such as double data rate (DDR), 3D XPoint™, Intel® Optane™, etc. (e.g., for quality of service (QOS)), interleave mode of the memory, or information that allows a home agent to determine whether to perform a memory access to a memory device. In some examples, memory controllers (e.g., MC0, MC1, and so forth) can issue memory access requests (e.g., read or write) to a memory device on behalf of a core.

Figure 4A:
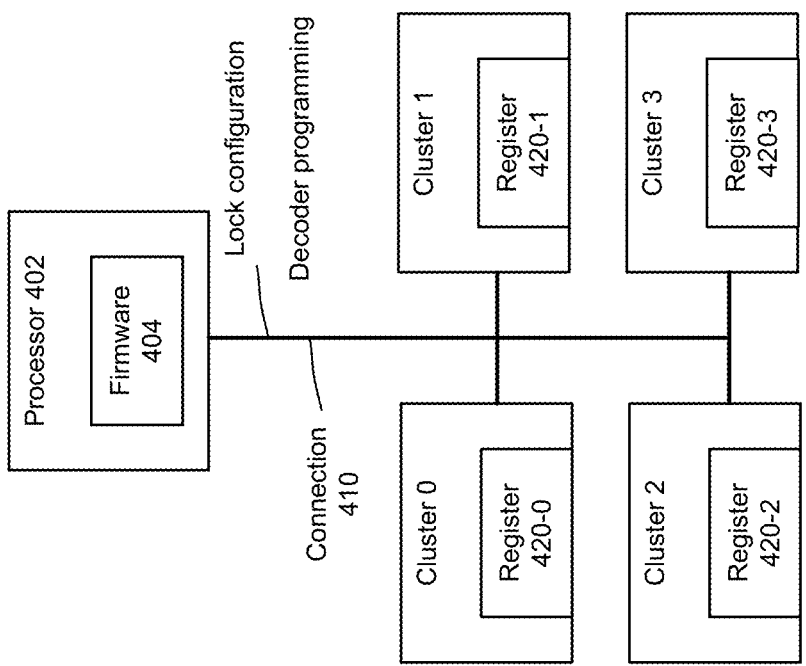
FIG. 4A depicts an example system.

FIG. 4A depicts an example system for configuring clusters of a CPU socket. In this example, processor 402 can include a core or microcontroller that executes firmware 404. Various examples of firmware 404 include one or more of: basic I/O system (BIOS), Universal Extensible Firmware Interface (UEFI) or a boot loader. For example, processor 402 can be a core or microcontroller within a cluster or a processor or microcontroller outside of a cluster. Connection 410 can provide a connection between processor 402 and clusters 0-3. Connection 410 can include a mesh topology, ring topology, or others. Using connection 410, firmware 404 can cause a lock configuration of one or more of clusters 0-3 and a memory rule programming, in accordance with embodiments described herein. Memory rule programming can be performed for one or more of registers 420-0 to 420-3.

Figure 4B:
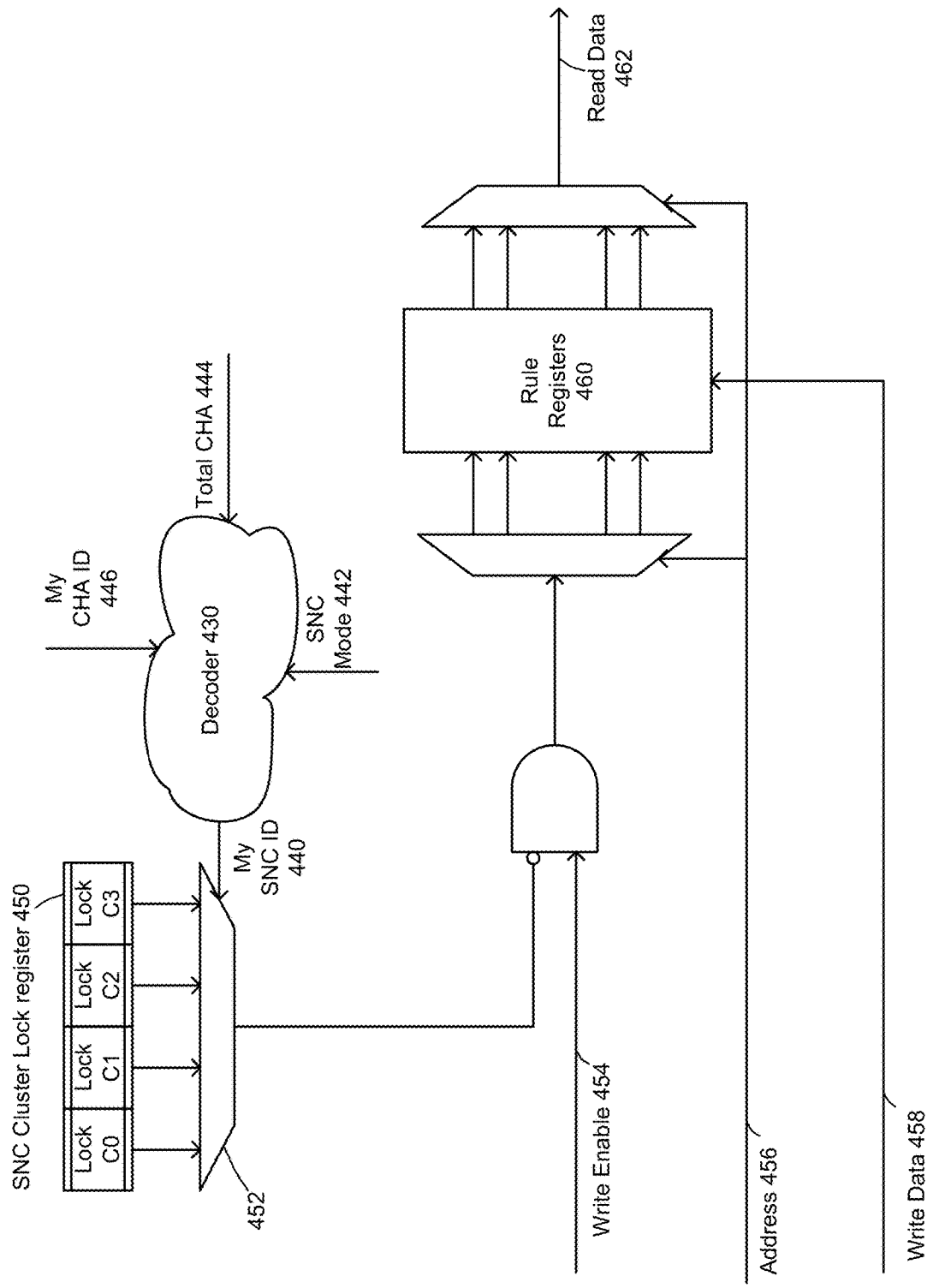
FIG. 4B depicts an example decoder system.

FIG. 4B depicts a logical representation of a system for controlling whether a memory rule is programmed at a cluster. In response to a multi-cast programming of memory rules of clusters, a mask can be applied to prevent programming of a memory rule in a cluster that is not to be programmed. Programming specific memory rules can be performed using lock registers to permit or deny programming of the specific memory rule. A CHA can use a lock register which has bits corresponding to a cluster. For example, SNC Cluster Lock register 450 can include 4 bits, where a bit corresponds to a cluster. In some examples, SNC Cluster Lock register 450 can include 2 bits to represent 4 clusters. Other numbers of bits can be used, dependent on a number of clusters, to identify a cluster as receiving programming or not receiving programming. Lock register 450 can indicate whether the cluster is to be programmed or not programmed during a particular programming operation.

Firmware can cause configuration of lock bits in lock register 450 before performing multi-cast register programming. For example, for configuring DRAM rules for CHAs in SNC cluster 0, the firmware may cause a multi-cast write to CHAs 0-3 to configure SNC Cluster Lock register 450 to unlock Cluster 0 (e.g., value 0), and keep the bits corresponding to Cluster 1, Cluster 2 and Cluster 3 in 'lock' (e.g., value 1). Firmware can cause programming of clusters with configurations to permit register writes for a cluster or clusters that are to be programmed with memory rule registers where the configurations are multi-casted to CHAs 0-3 in the CPU socket.

After configuring lock register 450, in connection with a multi-cast of rule data to clusters of a socket to program memory rule registers, decoder 430 can determine whether data is to program memory rule registers 460 in particular. For example, decoder 430 can receive Total CHA 444, My CHA ID 446, and SNC mode 442 and output My SNC ID 440 to specify which lock indicator among Lock C0 to Lock C3 from register 450 to release to logical AND with Write Enable 454. Total CHA 444 could be provided by firmware and identify a total number of CHAs. My CHA ID 446 could provide an identifier of a CHA identifier for one or more CHAs. SNC mode 442 can define an SNC mode such as SNC2, SNC4 and so forth. In some examples, decoder 430 could output My SNC IDF 440 based on range registers, e.g., CHA 0-X-1 correspond to represents Cluster0, CHA X-Y-1 correspond to Cluster 1, and so on.

Write Enable 452 can be ANDd with a lock bit permission indicator from register 450 for a cluster's ClusterID (e.g., C0 to C3) to permit or deny Address 456 and Write Data 458 to be written to rule registers 460. For example, Address 456 can indicate a register that BIOS is trying to program. For example, Write Data 458 can include DRAM rule register content or address map or ranges belonging to a cluster such as a range of address map assigned to a CHA. Application of a permission or denial mask can be repeated for a next programming of clusters of the socket until decoders of clusters in the socket are programmed. By having firmware set up the context of the multi-cast writes, an SNC cluster specific multi-cast capability can be achieved and DRAM rule duplication across the SNC clusters that do not support DRAMs for which DRAM rules are received can be eliminated, thereby potentially reducing a number of rule registers.

Figure 5:
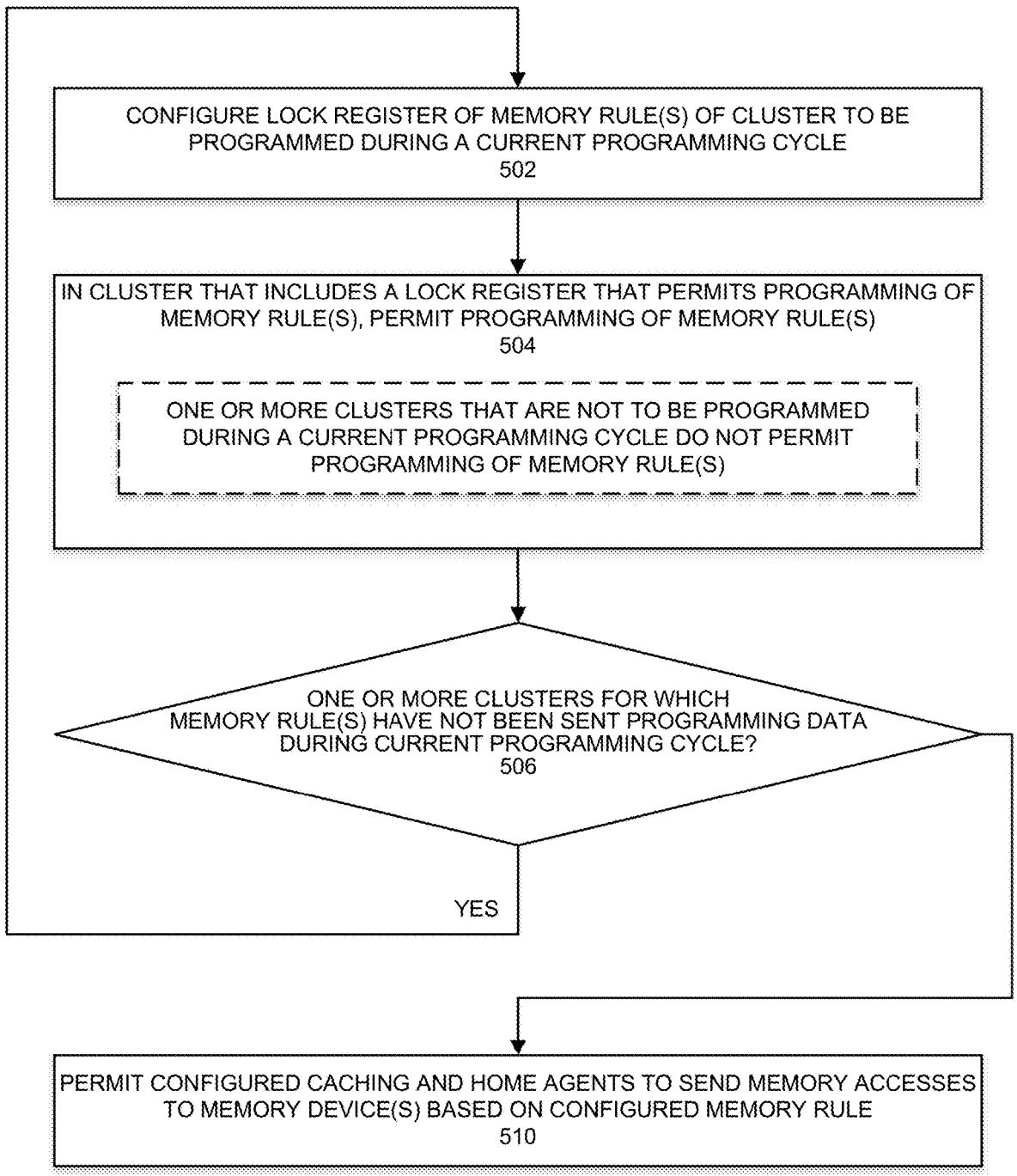
FIG. 5 depicts an example process.

FIG. 5 depicts an example process that can be used to program rule registers of a cluster among multiple clusters in connection with multi-cast programming of rule registers. At 502, a lock register of a cluster having one or more memory rules that are to be programmed during a current programming cycle can be configured to permit programming of memory rule circuitry. Memory rule circuitry can be configured to permit one or more CHAs to access content of a memory device in connection with accessing data as part of a cache coherency operation. In some examples, the cluster includes memory rule circuitry for memory devices for which CHAs of the cluster are to perform cache coherency.

At 504, the cluster can receive a multi-cast of memory rule configuration data. Based on the lock register permitting the memory rule circuitry of the cluster to be programmed, the memory rule circuitry can be programmed. Other clusters, whether previously programmed or unprogrammed, can receive the multi-cast of memory rule configuration data, but due to their lock registers not permitting configuration of memory rule circuitry, the programming of memory rule circuitry can be denied.

At 506, a determination can be made if memory rules of the available clusters are configured. If memory rules of the available clusters are not configured, the process can proceed to 502 to lock a register of one or more clusters having memory rules that have been previously programmed or are not to be programmed. If memory rules of the available clusters are configured, the process can proceed to 510 to permit one or more CHAs for a cluster to send memory accesses for addresses configured in the memory rule.

Figure 6:
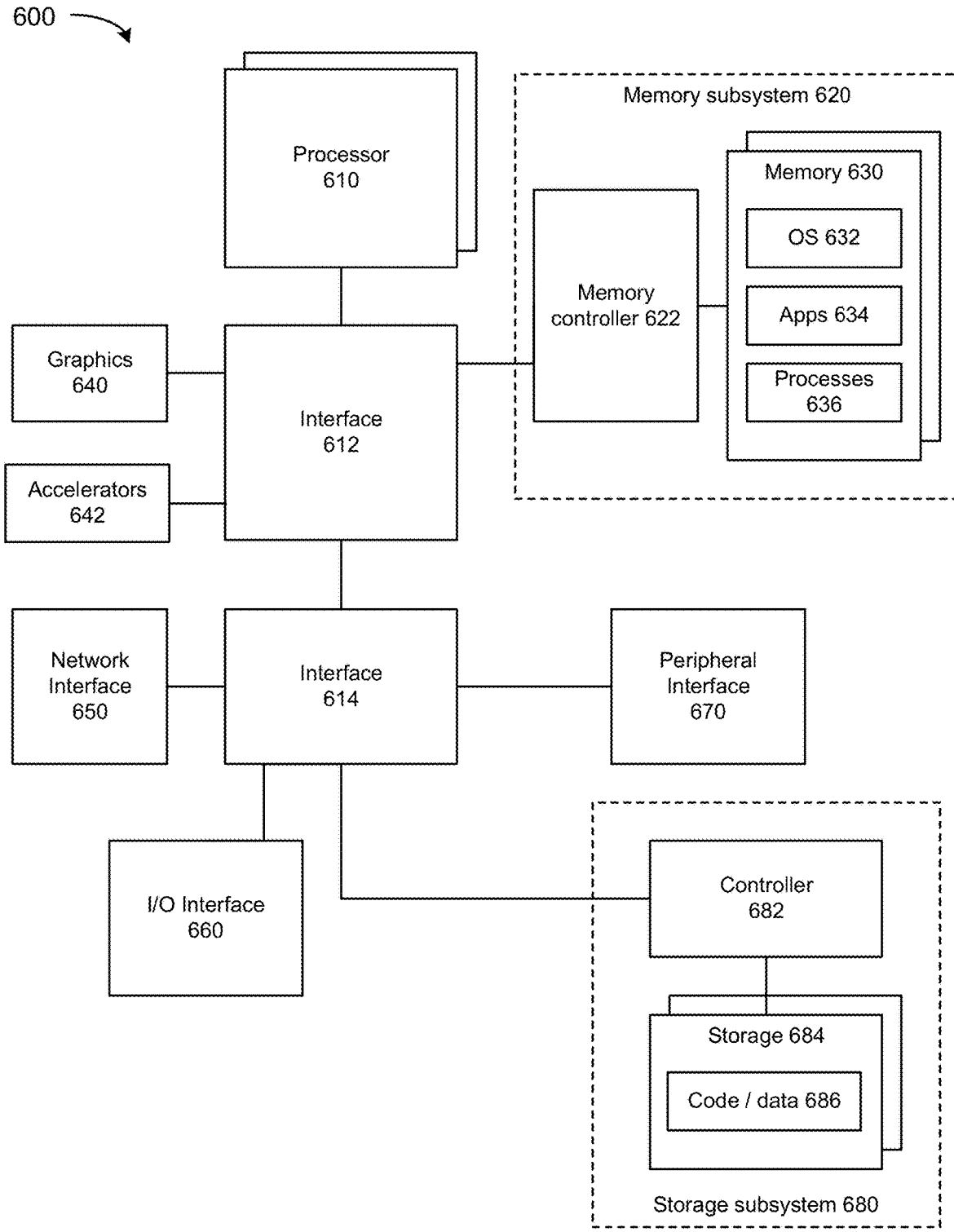
FIG. 6 depicts a system.

FIG. 6 depicts an example system. Various embodiments can be used by system 600 to program a memory rule that indicates memory ranges in a memory or storage device accessible to Caching/Home Agent (CHA) or Home Agent of a cluster. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

While description is provided with respect to a CPU, embodiments can be utilized for XPUs, where an XPU can include one or more of: a CPU, a graphics processing unit (GPU), general purpose GPU (GPGPU), and/or other processing units (e.g., accelerators or programmable or fixed function FPGAs). For example, an XPU could be a device with a CPU, GPU, a cryptographic accelerator, and/or an inference engine.

In one example, system 600 includes interface 612 coupled to processor 610, which can represent a higher speed interface or a high throughput interface for system components that uses higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be fixed function and/or programmable offload engines that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs).

Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue memory commands to memory 630. It can be understood that memory controller 622 could be a physical part of processor 610 or a physical part of interface 612. For example, memory controller 622 can be an integrated memory controller, integrated onto a circuit with processor 610.

While not specifically illustrated, it can be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory. Various embodiments can be used in connection with network interface 650, processor 610, and memory subsystem 620.

Some examples of network device 650 are part of an Infrastructure Processing Unit (IPU) or data processing unit (DPU) or utilized by an IPU or DPU. An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614. Various embodiments can use a memory hub to access volatile or non-volatile memory devices.

A volatile memory device includes a memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell (PLC) or some other NAND). A NVM device can also include a byte-addressable write-in-place three dimensional crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute systems of processors, memories, storages, network interfaces, and other components. High speed interconnects can be used to access devices such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, NVLink, Advanced Microcontroller Bus Architecture (AMBA) interconnect, OpenCAPI, Gen-Z, Cache Coherent Interconnect for Accelerators (CCIX), Infinity Fabric (IF), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Figure 7:
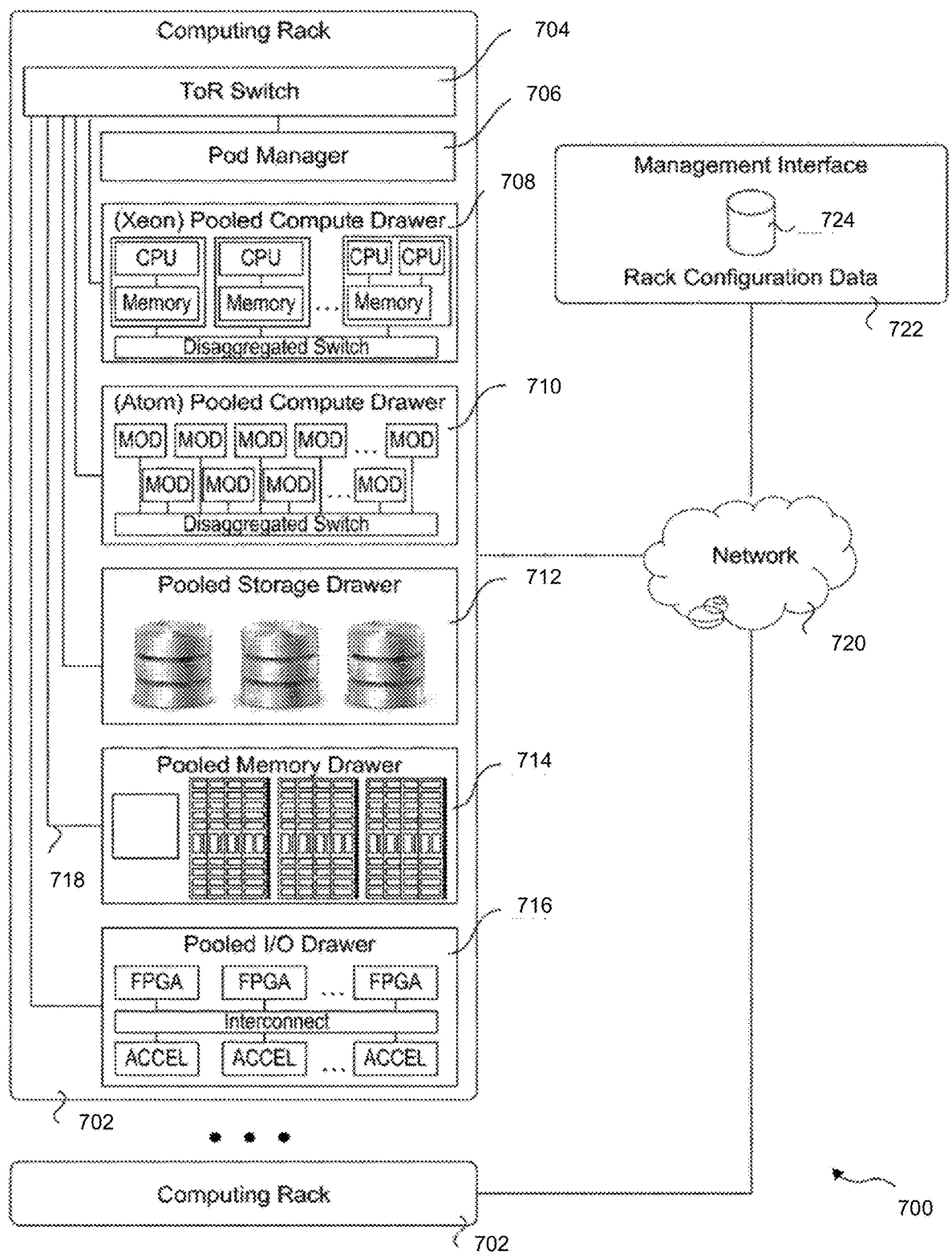
FIG. 7 depicts an environment.

FIG. 7 depicts an environment 700 includes multiple computing racks 702, one or more including a Top of Rack (ToR) switch 704, a pod manager 706, and a plurality of pooled system drawers. Various embodiments can be used by environment 700 to program a memory rule that indicates memory ranges in a memory or storage device accessible to Caching/Home Agent (CHA) or Home Agent of a cluster. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 708, and Intel® ATOM™ pooled compute drawer 710, a pooled storage drawer 712, a pooled memory drawer 714, and a pooled I/O drawer 716. Any of the pooled system drawers is connected to ToR switch 704 via a high-speed link 718, such as an Ethernet link or a Silicon Photonics (SiPh) optical link.

Multiple of the computing racks 702 may be interconnected via their ToR switches 704 (e.g., to a pod-level switch or data center switch), as illustrated by connections to a network 720. In some embodiments, groups of computing racks 702 are managed as separate pods via pod manager(s) 706. In one embodiment, a single pod manager is used to manage the racks in the pod. Alternatively, distributed pod managers may be used for pod management operations.

Environment 700 further includes a management interface 722 that is used to manage various aspects of the environment. This includes managing rack configuration, with corresponding parameters stored as rack configuration data 724.

In some examples, embodiments described herein can be used in connection with a base station (e.g., 3G, 4G, 5G, and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

For example, various embodiments can be used for wired or wireless protocols (e.g., 3GPP Long Term Evolution (LTE) (4G) or 3GPP 5G), on-premises data centers, off-premises data centers, base station devices, sensor data sender or receiver devices (e.g., for autonomous vehicles or augmented reality applications), endpoint devices, servers, routers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof. According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z." "

Illustrative examples of the devices, systems, and methods disclosed herein are provided below. An embodiment of the devices, systems, and methods may include any one or more, and any combination of, the examples described below.

Example 1 includes a method comprising: programming a memory rule for a home agent, wherein the programming a memory rule for a home agent comprises: receiving at least one memory rule programming and based on a cluster associated with the home agent, configuring a memory rule register using a memory rule programming from among the at least one memory rule programming.

Example 2 includes one or more examples, wherein the receiving at least one memory rule programming comprises: receiving a first memory rule programming and receiving a second memory rule programming.

Example 3 includes one or more examples, wherein: based on a cluster associated with the home agent, configuring a memory rule register using a memory rule programming from among the at least one memory rule programming comprises: applying a mask to reject the first memory rule programming; and applying the mask to accept the second memory rule programming and program the memory rule for the home agent.

Example 4 includes one or more examples, wherein applying the mask to reject the first memory rule programming comprises rejecting the first memory rule programming based on the mask indicating a cluster associated with the memory rule that is to be programmed is to reject the first memory rule programming.

Example 5 includes one or more examples, and includes: receiving the mask prior to the receiving the first memory rule programming, the mask indicative of whether a cluster associated with the home agent is to accept or reject the first memory rule programming.

Example 6 includes one or more examples, and includes programming a second memory rule for a second home agent, wherein the programming a second memory rule for a second home agent comprises: based on a second cluster associated with the second home agent, configuring a second memory rule register using a second memory rule programming from among the at least one memory rule programming.

Example 7 includes one or more examples, wherein a first memory rule programming is associated with the cluster and the second memory rule programming is associated with the second cluster.

Example 8 includes one or more examples, and includes an apparatus comprising: a first memory rule circuitry to specify access by a first home agent to one or more memory devices, the first memory rule circuitry configured by: receipt of multiple memory rule programs and acceptance or rejection of a first memory rule program based on a cluster associated with the first home agent, wherein the first memory rule program is one of the multiple memory rule programs.

Example 9 includes one or more examples, wherein the first memory rule program comprises one or more of: a base address, end address, memory type, or interleave mode.

Example 10 includes one or more examples, wherein based on a programming of the first memory rule circuitry, the first home agent is to determine whether to access a memory address associated with the one or more memory devices for a cache coherency operation.

Example 11 includes one or more examples, wherein the acceptance or rejection of a first memory rule program based on a cluster associated with the first home agent comprises: application of a mask to cause acceptance of the first memory rule program based on the mask indicating the cluster associated with the first memory rule circuitry is to accept the first memory rule program and application of the mask is to cause rejection of the first memory rule program based on the mask indicating the cluster associated with the first memory rule circuitry is to reject the first memory rule program.

Example 12 includes one or more examples, wherein the first memory rule circuitry is to receive the mask prior to the receipt of the first memory rule program, the mask indicative of whether the cluster associated with the first memory rule circuitry is to accept or reject the first memory rule programming.

Example 13 includes one or more examples, and includes a second memory rule circuitry to specify access by a second home agent, the second memory rule circuitry configured by: receipt of the multiple memory rule programs and acceptance or rejection of a second memory rule program based on a cluster associated with the second home agent, wherein the second memory rule program is one of the multiple memory rule programs.

Example 14 includes one or more examples, wherein the first memory rule program is associated with a first cluster and the second memory rule program is associated with a second cluster.

Example 15 includes one or more examples, wherein: a processor-executed firmware is to cause transmission of the mask, the first memory rule program, and the second memory rule program.

Example 16 includes one or more examples, and includes a non-transitory computer-readable medium comprising instructions stored thereon, that if executed by one or more processors, cause the one or more processors to: execute firmware to cause: transmission to one or more memory rule circuitry devices associated with one or more home agents of: a mask to indicate whether to accept or reject a first memory rule programming and a second memory rule programming; the first memory rule programming; and the second memory rule programming.

Example 17 includes one or more examples, wherein: the first memory rule programming comprises one or more of: a base address, end address, memory type, or interleave mode and the second memory rule programming comprises one or more of: a base address, end address, memory type, or interleave mode.

Example 18 includes one or more examples, wherein the one or more memory rule circuitry devices are to: apply the mask to accept or reject the first memory rule programming and accept or reject the second memory rule programming.

Example 19 includes one or more examples, wherein execution of the firmware is to cause: transmission of the mask prior to transmission of the first memory rule programming and the second memory rule programming.

Example 20 includes one or more examples, wherein: based on a programming of a memory rule circuitry device of the one or more memory rule circuitry devices, a caching and home agent (CHA) is to determine whether to access a memory address of a memory device for a cache coherency operation.

What is claimed is:

1. A method comprising:
 programming a memory rule for a home agent, wherein the programming a memory rule for a home agent comprises:
  receiving at least one memory rule programming and based on a cluster associated with the home agent, configuring a memory rule register using a memory rule programming from among the at least one memory rule programming;
  determining that a second cluster is not associated with the home agent; and
  for the second cluster determined not to be associated with the home agent, not configuring a memory rule register associated with the second cluster using the memory rule programming.

2. The method of claim 1, wherein the receiving at least one memory rule programming comprises:
 receiving a first memory rule programming and receiving a second memory rule programming.

3. The method of claim 2, wherein:
 based on a cluster associated with the home agent, configuring a memory rule register using a memory rule programming from among the at least one memory rule programming comprises:
  applying a data to reject the first memory rule programming; and applying the data to accept the second memory rule programming and program the memory rule for the home agent.

4. The method of claim 3, wherein applying the data to reject the first memory rule programming comprises rejecting the first memory rule programming based on the data indicating a cluster associated with the memory rule that is to be programmed is to reject the first memory rule programming.

5. The method of claim 3, comprising:
receiving the data prior to the receiving the first memory rule programming, the data indicative of whether a cluster associated with the home agent is to accept or reject the first memory rule programming.

6. The method of claim 1, comprising:
programming a second memory rule for a second home agent, wherein the programming a second memory rule for a second home agent comprises:
based on the second cluster associated with the second home agent, configuring a second memory rule register using a second memory rule programming from among the at least one memory rule programming.

7. The method of claim 6, wherein a first memory rule programming is associated with the cluster and the second memory rule programming is associated with the second cluster.

8. An apparatus comprising:
a first memory rule circuitry to specify access by a first home agent to one or more memory devices, the first memory rule circuitry configured by:
receipt of multiple memory rule programs and
acceptance or rejection of a first memory rule program based on a cluster associated with the first home agent, wherein the first memory rule program is one of the multiple memory rule programs, wherein:
based on a determination that the cluster is associated with the first home agent, the first memory rule circuitry is to be configured by the first memory rule program and
based on a determination that the cluster is not associated with the first home agent, the first memory rule circuitry is not to be configured by the first memory rule program.

9. The apparatus of claim 8, wherein
the first memory rule program comprises one or more of: a base address, end address, memory type, or interleave mode.

10. The apparatus of claim 8, wherein
based on a programming of the first memory rule circuitry, the first home agent is to determine whether to access a memory address associated with the one or more memory devices for a cache coherency operation.

11. The apparatus of claim 8, wherein the acceptance or rejection of a first memory rule program based on a cluster associated with the first home agent comprises:
application of data to cause acceptance of the first memory rule program based on the data indicating the cluster associated with the first memory rule circuitry is to accept the first memory rule program and
application of the data is to cause rejection of the first memory rule program based on the mask data indicating the cluster associated with the first memory rule circuitry is to reject the first memory rule program.

12. The apparatus of claim 11, wherein
the first memory rule circuitry is to receive the data prior to receipt of the first memory rule program, the data indicative of whether the cluster associated with the first memory rule circuitry is to accept or reject the first memory rule program.

13. The apparatus of claim 8, comprising:
a second memory rule circuitry to specify access by a second home agent, the second memory rule circuitry configured by:
receipt of the multiple memory rule programs and
acceptance or rejection of a second memory rule program based on a cluster associated with the second home agent, wherein the second memory rule program is one of the multiple memory rule programs.

14. The apparatus of claim 13, wherein the first memory rule program is associated with a first cluster and the second memory rule program is associated with a second cluster.

15. The apparatus of claim 13, wherein:
a processor-executed firmware is to cause transmission of the mask a data, the first memory rule program, and the second memory rule program.

16. At least one non-transitory computer-readable medium comprising instructions stored thereon, that if executed by one or more processors, cause the one or more processors to:
execute firmware to cause:
transmission to one or more memory rule circuitry devices associated with one or more home agents of:
data to indicate whether to accept or reject a first memory rule programming and a second memory rule programming;
the first memory rule programming; and
the second memory rule programming.

17. The non-transitory computer-readable medium of claim 16, wherein:
the first memory rule programming comprises one or more of: a base address, end address, memory type, or interleave mode and
the second memory rule programming comprises one or more of: a base address, end address, memory type, or interleave mode.

18. The non-transitory computer-readable medium of claim 16, wherein the one or more memory rule circuitry devices are to:
apply the data to accept or reject the first memory rule programming and accept or reject the second memory rule programming.

19. The non-transitory computer-readable medium of claim 16, wherein execution of the firmware is to cause:
transmission of the mask data prior to transmission of the first memory rule programming and the second memory rule programming.

20. The non-transitory computer-readable medium of claim 16, wherein:
based on a programming of a memory rule circuitry device of the one or more memory rule circuitry devices, a caching and home agent (CHA) is to determine whether to access a memory address of a memory device for a cache coherency operation.

\* \* \* \* \*